(12) United States Patent
Min et al.

(10) Patent No.: US 10,329,485 B2
(45) Date of Patent: *Jun. 25, 2019

(54) LIQUID CRYSTAL DEVICE

(71) Applicant: LG CHEM, LTD., Seoul (KR)

(72) Inventors: Sung Joon Min, Daejeon (KR); Dong Hyun Oh, Daejeon (KR); Jung Sun You, Daejeon (KR); Jin Hong Kim, Daejeon (KR)

(73) Assignee: LG CHEM, LTD., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 14/602,056

(22) Filed: Jan. 21, 2015

(65) Prior Publication Data
US 2015/0131033 A1 May 14, 2015

Related U.S. Application Data

(63) Continuation-in-part of application No. PCT/KR2014/000764, filed on Jan. 27, 2014.

(30) Foreign Application Priority Data

Jan. 25, 2013 (KR) .......................... 10-2013-0008603
Jan. 27, 2014 (KR) .......................... 10-2014-0009876

(51) Int. Cl.
C09K 19/40 (2006.01)
C09K 19/52 (2006.01)
(Continued)

(52) U.S. Cl.
CPC .......... C09K 19/544 (2013.01); C09K 19/408 (2013.01); C09K 19/52 (2013.01);
(Continued)

(58) Field of Classification Search
CPC .. C09K 19/5406; C09K 19/408; C09K 19/52; C09K 19/544; G02F 1/1334; G02F 2001/13345
See application file for complete search history.

(56) References Cited

U.S. PATENT DOCUMENTS 5,566,008 A * 10/1996 Yoshida ................ G02F 1/1334
349/153
5,585,035 A * 12/1996 Nerad ................... C09K 19/544
252/299.01
(Continued)

FOREIGN PATENT DOCUMENTS

CN 101090955 A 12/2007
CN 101679865 A 3/2010
(Continued)

OTHER PUBLICATIONS

Taiwanese Office Action dated Mar. 9, 2015 in TW Patent Application No. 103103023 and English translation of Office Action, 7 pages.
(Continued)

*Primary Examiner* — Cynthia H Kelly
*Assistant Examiner* — Anna Malloy
(74) *Attorney, Agent, or Firm* — Rothwell, Figg, Ernst & Manbeck, P.C.

(57) ABSTRACT

A liquid crystal device, a precursor composition, a method of manufacturing a liquid crystal device, an apparatus of manufacturing a liquid crystal device, and use of the liquid crystal device are provided. A device capable of being driven at a low driving voltage can be provided. The device can be realized so that the device can be driven in a normally transparent mode or a normally black mode. Also, the device has other excellent characteristics such as a contrast ratio. Such a liquid crystal device can be applied to various light modulation devices such as smart windows, window-pro-
(Continued)

tecting films, flexible display devices, active retarders for displaying 3D images, or viewing angle-adjusting films.

8 Claims, 4 Drawing Sheets

(51) Int. Cl.
  *C09K 19/54* (2006.01)
  *G02F 1/1334* (2006.01)
(52) U.S. Cl.
  CPC .. *G02F 1/1334* (2013.01); *G02F 2001/13345* (2013.01); *G02F 2001/13347* (2013.01)

(56) References Cited

U.S. PATENT DOCUMENTS

| | | | |
|---|---|---|---|
| 6,774,963 B1* | 8/2004 | Nakao | G02F 1/133514 349/104 |
| 9,840,668 B2* | 12/2017 | Min | G02F 1/1334 |
| 2001/0038369 A1* | 11/2001 | Adachi | G09G 3/36 345/87 |
| 2002/0067329 A1 | 6/2002 | Toko et al. | |
| 2006/0151744 A1* | 7/2006 | Cheong | C07F 7/0818 252/299.62 |
| 2009/0098314 A1* | 4/2009 | Takaku | C09K 19/544 428/1.1 |
| 2009/0130343 A1 | 5/2009 | Cheon | |
| 2009/0153756 A1* | 6/2009 | Roberts | C09K 19/408 349/35 |

FOREIGN PATENT DOCUMENTS

| | | |
|---|---|---|
| CN | 102540543 A | 7/2012 |
| CN | 102643387 A | 8/2012 |
| EP | 0 509 465 A | 10/1992 |
| JP | H04-156425 A | 5/1992 |
| JP | H05-257134 A | 10/1993 |
| JP | 09-152581 A | 6/1997 |
| JP | 2001-051260 A | 2/2001 |
| JP | 4113744 B2 | 4/2008 |
| JP | 2009-242566 A | 10/2009 |
| JP | 2011-095407 A | 5/2011 |
| JP | 2012-027150 A | 2/2012 |
| JP | 4984842 B2 | 5/2012 |
| KR | 1993-0013794 A | 5/1994 |
| KR | 10-2006-0082821 A | 7/2006 |
| TW | 200632078 A | 9/2006 |
| WO | 2009/076127 A1 | 6/2009 |

OTHER PUBLICATIONS

International Search Report issued in International Application No. PCT/KR2014/00764 dated May 27, 2014, 2 pages.
Office Action issued for Chinese Patent Application No. 201480002386.8 dated Aug. 23, 2016, with English translation, 8 pages.
Extended Search Report issued for European Patent Application No. 14743147.2 dated Nov. 17, 2016, 11 pages.
Cho Y H et al; "High performance holographic polymer dispersed liquid crystal systems using multi-functional acrylates and siloxane-containing epoxides as matrix components;" Applied Physics A; Materials Science & Processing; vol. 83; No. 3; Jun. 1, 2006 (Jun. 1, 2006); pp. 365-375.

* cited by examiner

LIQUID CRYSTAL DEVICE

CROSS-REFERENCE TO RELATED APPLICATION

This application is a continuation-in-part of International Application PCT/KR2014/000764, with an international filing date of Jan. 27, 2014, which claims priority to and the benefit of Korean Patent Application No. 10-2013-0008603, filed Jan. 25, 2013 and Korean Patent Application No. 10-2014-0009876, filed Jan. 27, 2014, the disclosure of which is incorporated herein by reference in its entirety.

BACKGROUND

1. Field of the Invention

The present invention relates to a liquid crystal device, a precursor composition, a method of manufacturing a liquid crystal device, an apparatus of manufacturing a liquid crystal device, and use of the liquid crystal device.

2. Discussion of Related Art

A liquid crystal display device (LCD) displays an image by aligning a liquid crystal compound and switching the alignment through application of a voltage. A method of manufacturing LCD is very expensive, and thus requires large production lines and facilities.

So-called polymer-dispersed liquid crystals (PDLCs; the term "PDLCs" used in this specification are used as a so-called superordinate concept including polymer network liquid crystals (PNLCs) or polymer stabilized liquid crystals (PSLCs)) device, which is realized by dispersing liquid crystal compound in a polymer, has been known in the related art. The PDLCs may be manufactured in a simpler manner than in LCDs.

As disclosed in Patent Document 1, a liquid crystal compound is generally present in the PDLCs in an unaligned state. Therefore, the PDLCs remain opaque in a state in which a voltage is not applied to the PDLCs, a state of which is generally referred to as a so-called scattering mode. When a voltage is applied to the PDLCs, the liquid crystal compound is aligned accordingly. As a result, the PDLCs become transparent. Using this, it is possible to switch between the transparent mode (i.e., a white mode) and the scattering mode.

PRIOR ART DOCUMENTS

Patent Documents

Patent Document 1: Korean Laid-Open Patent No. 1993-0013794

SUMMARY OF THE INVENTION

The present invention is directed to providing a liquid crystal device, a precursor composition, a method of manufacturing a liquid crystal device, an apparatus of manufacturing a liquid crystal device, and use of the liquid crystal device.

One aspect of the present invention provides an illustrative liquid crystal device including a liquid crystal layer, and the liquid crystal layer includes a polymer network and a liquid crystal compound. Also, the liquid crystal compound may be present in the polymer network in a state in which the liquid crystal compound is dispersed in the polymer network.

The polymer network may be a polymer network of a precursor including a silicon compound (hereinafter referred to as a polymer network precursor). For example, the polymer network may include the precursor itself, or may include a reaction product, for example, a polymerization reaction product, of the precursor.

The polymer network precursor may include a silicon compound. The silicon compound may be a polymerizable silicon compound. The term "polymerizable silicon compound" may refer to a silicon compound containing at least one polymerizable functional group. For example, the polymer network may be a network formed by cross-linking or polymerizing the polymerizable silicon compound or a polymerizable compound which is different from the silicon compound. The precursor may also include a non-polymerizable silicon compound in addition to the polymerizable silicon compound.

The ratio of the silicon compound in the precursor is not particularly limited, but may be, for example, 5% or more by weight, 10% or more by weight, 15% or more by weight, 20% or more by weight, 25% or more by weight, 30% or more by weight, 35% or more by weight, 40% or more by weight, 45% or more by weight, or 50% or more by weight. The upper limit of the ratio of the silicon compound in the precursor is not particularly limited. For example, the upper limit of the ratio of the silicon compound may be 100% by weight considering that all precursor may be realized in the form of a silicon compound.

A compound represented by the following Formula 1 or 2 may be, for example, used as the silicon compound.

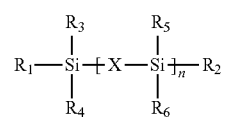

[Formula 1]

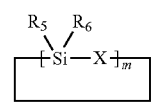

[Formula 2]

In Formula 1 or 2, n is an integer ranging from 0 to 10, m is an integer ranging from 2 to 8, X is —O— or —NW—, and $R_1$ to $R_6$ are each independently an alkyl group, an alkoxy group, an aryl group, a polymerizable functional group, -A-$R_7$ or -L-Si$(R_8)_p(R_9)_{(3-p)}$, wherein A and L are each independently an alkylene group, an alkynylene group, an arylene group, an alkenylene group, an alkylidene group, —O— or —NW—, $R_7$ is an alkyl group, an alkoxy group, an aryl group or a polymerizable functional group, $R_8$ is a polymerizable functional group, $R_9$ is an alkyl group, an alkoxy group or an aryl group, p is an integer ranging from 0 to 3, and W is hydrogen or an alkyl group.

As such, Examples of the polymerizable functional group may, for example, include an alkenyl group, an epoxy group, a cyano group, a carboxyl group, a (meth)acryloyl group, or a (meth)acryloyloxy group. In this specification, the term (meth)acryl refers to an acryl or (meth)acryl group.

Unless particularly stated otherwise in this specification, the term "alkyl group" may be, for example, a linear or branched alkyl group having 1 to 20 carbon atoms, 1 to 16 carbon atoms, 1 to 12 carbon atoms, 1 to 8 carbon atoms or 1 to 4 carbon atoms. The alkyl group may be optionally substituted with one or more substituents.

Unless particularly stated otherwise in this specification, the term "alkoxy group" may, for example, refer to an alkoxy group having 1 to 20 carbon atoms, 1 to 16 carbon atoms, 1 to 12 carbon atoms, 1 to 8 carbon atoms or 1 to 4 carbon atoms. The alkoxy group may be linear, branched or cyclic. The alkoxy group may be optionally substituted with one or more substituents.

Unless particularly stated otherwise in this specification, the term "aryl group" or "arylene group" may refer to a monovalent or divalent residue derived from an aromatic compound or a derivative thereof, which includes a benzene ring or has a structure in which two or more benzene rings are condensed or joined together in a state in which the two or more benzene rings share one or two carbon atoms. The aryl group or the arylene group may be, for example, an aryl group or arylene group having 6 to 22 carbon atoms, 6 to 20 carbon atoms, 6 to 18 carbon atoms, 6 to 16 carbon atoms, 6 to 14 carbon atoms or 6 to 12 carbon atoms. Here, the aryl group or arylene group may be optionally substituted with one or more substituents.

Unless particularly stated otherwise in this specification, the term "alkylene group" or "alkylidene group" may, for example, refer to an alkylene group or an alkylidene group having 1 to 20 carbon atoms, 1 to 16 carbon atoms, 1 to 12 carbon atoms, 1 to 8 carbon atoms or 1 to 4 carbon atoms. For example, the alkylene group or the alkylidene group may be linear, branched or cyclic. Also, the alkylene group or the alkylidene group may be optionally substituted with one or more substituents.

Unless particularly stated otherwise in this specification, the term "alkenylene group" or "alkynylidene group" may, for example, refer to an alkenylene group or an alkynylidene group having 2 to 20 carbon atoms, 2 to 16 carbon atoms, 2 to 12 carbon atoms, 2 to 8 carbon atoms or 2 to 4 carbon atoms. For example, the alkenylene group or the alkynylidene group may be linear, branched or cyclic. Also, the alkenylene group or the alkynylidene group may be optionally substituted with one or more substituents.

Unless particularly stated otherwise in this specification, the term "alkenyl group" may, for example, refer to an alkenyl group having 2 to 20 carbon atoms, 2 to 16 carbon atoms, 2 to 12 carbon atoms, 2 to 8 carbon atoms or 2 to 4 carbon atoms. For example, the alkenyl group may be linear, branched or cyclic. Also, the alkenyl group may be optionally substituted with one or more substituents.

In this specification, examples of the substituent which may be substituted for the alkyl group, the alkoxy group, the aryl group, the alkylene group, the alkylidene group, the alkenylene group, the alkynylene group, the arylene group or the polymerizable functional group may include a halogen atom such as chlorine, bromine or iodine, an alkyl group, an alkoxy group, an alkenyl group, an epoxy group, an oxo group, an oxetanyl group, a thiol group, a cyano group, a carboxyl group, an acryloyl group, a (meth)acryloyl group, an acryloyloxy group, a (meth)acryloyloxy group, or an aryl group, but the present invention is not limited thereto.

When the compound of Formula 1 or 2 is a polymerizable silicon compound, the compound of Formula 1 or 2 may contain at least one polymerizable functional group, for example, 2 or more, 2 to 10, 2 to 8, 2 to 6, 2 to 5, 2 to 4, 4, or 2 polymerizable functional groups. The polymerizable functional group may be selected from the kinds of the above-described polymerizable functional groups. In general, an alkenyl group having 2 to 8 carbon atoms or 2 to 4 carbon atoms such as a vinyl group or allyl group, a (meth)acryloyl group, or a (meth)acryloyloxy group may be used as the polymerizable functional group.

In Formulas 1 and 2, $R_5$ to $R_9$ may be substantially the same as or different from each other when $R_5$ to $R_9$ are present in plural numbers.

According to another exemplary embodiment, n in Formula 1 may be an integer ranging 0 to 9, 0 to 7, 0 to 5, or 0 to 3. According to another exemplary embodiment, m in Formula 2 may be an integer ranging 2 to 6.

In Formula 1 or 2, X is —O— or —NW—, wherein W may be hydrogen or an alkyl group.

In Formula 1 or 2, $R_1$ to $R_6$ may each independently be an alkyl group, an alkoxy group, an aryl group, a polymerizable functional group, -A-$R_7$ or -L-Si$(R_8)_p(R_9)_{(3-p)}$, wherein A represents an alkylene group or an alkylidene group, $R_7$ represents an alkyl group or a polymerizable functional group, L represents an alkylene group, an alkylidene group, or —O—, p is an integer ranging from 0 to 2, $R_8$ represents a polymerizable functional group, and $R_9$ represents an alkyl group. As such, the polymerizable functional group may be selected from the alkenyl group, the (meth)acryloyl group, and the (meth)acryloyloxy group.

In Formula 1, $R_1$ may be, for example, an alkyl group, a polymerizable functional group or -A-$R_7$, wherein A represents an alkylene group or an alkylidene group, and $R_7$ represents a polymerizable functional group. As such, the polymerizable functional group may be selected from the alkenyl group, the (meth)acryloyl group, and the (meth)acryloyloxy group.

In Formula 1, $R_2$ may be, for example, an alkyl group, an alkoxy group, a polymerizable functional group, -A-$R_7$ or -L-Si$(R_8)_p(R_9)_{(3-p)}$, wherein A represents an alkylene group or an alkylidene group, $R_7$ represents a polymerizable functional group, L represents an alkylene group, an alkylidene group, or —O—, p is an integer ranging from 0 to 2, $R_8$ represents a polymerizable functional group, and $R_9$ represents an alkyl group. As such, the polymerizable functional group may be selected from the alkenyl group, the (meth)acryloyl group, and the (meth)acryloyloxy group.

In Formula 1, $R_3$ and $R_4$ may be, for example, each independently an alkyl group, an alkoxy group, an aryl group, -A-$R_7$ or -L-Si$(R_8)_p(R_9)_{(3-p)}$. As such, A represents an alkylene group or an alkylidene group, $R_7$ represents an alkyl group, L represents an alkylene group, an alkylidene group, or —O—, p is an integer ranging from 0 to 2, $R_8$ is a polymerizable functional group, and $R_9$ is an alkyl group. As such, the polymerizable functional group may be selected from the alkenyl group, the (meth)acryloyl group, and the (meth)acryloyloxy group.

In Formula 1, when n is 1 or more, $R_5$ and $R_6$ may be, for example, each independently an alkyl group, or an aryl group.

In Formula 2, $R_5$ and $R_6$ may be, for example, each independently an alkyl group, an aryl group, or a polymerizable functional group. As such, the polymerizable functional group may be selected from the alkenyl group, the (meth)acryloyl group, and the (meth)acryloyloxy group.

The precursor may include one or two or more silicon compounds represented by Formula 1 or 2.

When the precursor includes two or more silicon compounds, the precursor may include a difunctional silicon compound containing at least two polymerizable functional groups. When the precursor includes the two or more silicon compounds, the kinds of other compounds to be mixed with the difunctional silicon compound are not particularly limited. For example, the two difunctional silicon compounds may be mixed, or a polymerizable silicon compound rather than the difunctional silicon compound, or a silicon compound having no functional group may be mixed with the difunctional silicon compound. As such, examples of the polymerizable silicon compound rather than the difunctional silicon compound may, for example, include a tetrafunctional silicon compound, but the present invention is not limited thereto.

Examples of the difunctional silicon compound which may be properly used when the precursor includes the two or more silicon compounds may, for example, include a compound in which n in Formula 1 is in a range of 0 to 3, $R_1$ and $R_2$ are each independently a polymerizable functional group, $R_3$ to $R_6$ are each independently an alkyl group or an aryl group, and X represents —O—, but the present invention is not limited thereto.

Examples of the compound which may be used together with the difunctional silicon compound when the precursor includes the two or more silicon compounds may, for example, include another difunctional silicon compound rather than those already selected from the above-described difunctional silicon compounds; a compound in which n in Formula 1 is in a range of 0 to 5, $R_1$ is an alkyl group or -A-$R_7$ (wherein A represents an alkylene group or an alkylidene group, and $R_2$ is a polymerizable functional group), $R_2$ to $R_4$ are each independently an alkyl group or -L-Si($R_8$)$_p$($R_9$)$_{(3-p)}$ (wherein L represents an alkylene group, an alkylidene group or —O—, p is in a range of 0 to 2, $R_8$ is a polymerizable functional group, and $R_9$ is an alkyl group), $R_5$ and $R_6$ are each independently an alkyl group or an aryl group, and X represents —O—; or a compound in which m in Formula 2 is in a range of 2 to 6, and $R_5$ and $R_6$ are each independently an alkyl group or a polymerizable functional group, but the present invention is not limited thereto.

When the precursor includes the two or more silicon compounds, blending ratios of the silicon compounds are not particularly limited, and may be, for example, selected within a range in which the polymer network can exhibit alignability. For example, when the precursor includes another polymerizable silicon compound rather than the difunctional silicon compound, or a silicon compound having no functional group, the precursor may include another polymerizable silicon compound rather than the difunctional silicon compound, or a silicon compound having no functional group at a content of 10 to 150 parts by weight or 15 to 130 parts by weight, based on 100 parts by weight of the difunctional silicon compound. Unless particularly stated otherwise in this specification, the unit "part(s) by weight" may refer to a weight ratio between respective components.

The precursor may further include a compound rather than the silicon compound, for example, a polymerizable compound. Examples of such a polymerizable compound may include at least one of a difunctional acrylate compound, a tri- or more multifunctional acrylate compound, and a monofunctional acrylate compound. In the present invention, the term "acrylate compound" refers to a compound containing an acryloyl group or a (meth)acryloyl group, and the compound containing the one functional group is a monofunctional acrylate compound, and the compound containing the two or more functional groups is a multifunctional acrylate compound. For the sake of convenience of discrimination, the compound containing the two functional groups is hereinafter referred to as a difunctional acrylate compound, and the tri- or more multifunctional acrylate compound, that is, an acrylate compound containing the three or more functional groups, is simply referred to as a multifunctional acrylate compound. The multifunctional acrylate compound may, for example, contain 3 to 8, 3 to 7, 3 to 6, 3 to 5, or 3 to 4 functional groups. The kind of the acrylate compound is not particularly limited as long as it does not cause damage to desired physical properties, for example, alignability of the polymer network, etc.

For example, a compound represented by the following Formula 3 may be used as the difunctional acrylate compound.

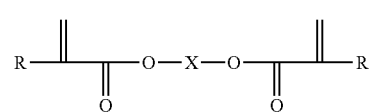

[Formula 3]

In Formula 3, R each independently represents hydrogen or an alkyl group having 1 to 4 carbon atoms, and X represents an alkylene group or an alkylidene group having 1 to 20 carbon atoms.

A compound represented by the following Formula 4 may be used as the multifunctional acrylate compound.

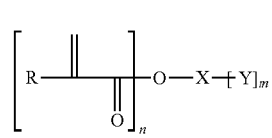

[Formula 4]

In Formula 4, n is an integer greater than or equal to 3, m is an integer ranging from 0 to 5, R is each independently hydrogen or an alkyl group having 1 to 4 carbon atoms, X represents a radical of (m+n) valence, and Y is hydrogen or an alkyl group.

A compound represented by the following Formula 5 may be, for example, used as the monofunctional acrylate compound.

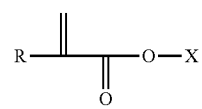

[Formula 5]

In Formula 5, R is hydrogen or an alkyl group having 1 to 4 carbon atoms, and X represents an alkyl group having 1 to 20 carbon atoms.

In Formulas 3 to 5, examples of the alkyl group which may appear in R or Y may include a methyl group or an ethyl group.

In Formula 3, the alkylene group or alkylidene group of X may be, for example, an alkylene group or an alkylidene group having 1 to 16 carbon atoms, 1 to 12 carbon atoms, 1 to 10 carbon atoms, 1 to 8 carbon atoms, 2 to 8 carbon atoms, or 4 to 8 carbon atoms. As such, the alkylene group or alkylidene group may be, for example, linear, branched or cyclic.

In Formula 4, n may be an integer greater than or equal to 3, or an integer ranging from 3 to 8, 3 to 7, 3 to 6, 3 to 5, or 3 to 4. Also, in Formula 4, m may be an integer ranging from 0 to 5, 0 to 4, 0 to 3, 0 to 2, or 0 to 1.

In Formula 4, X represents a radical of (m+n) valence, for example, a radical of (m+n) valence derived from a hydrocarbon having 2 to 20 carbon atoms, 2 to 16 carbon atoms, 2 to 12 carbon atoms, 2 to 8 carbon atoms or 2 to 6 carbon atoms, for example, a linear or branched alkane.

In Formula 5, the alkyl group of X may be, for example, a linear or branched alkyl group having 1 to 20 carbon atoms, 1 to 16 carbon atoms, 1 to 12 carbon atoms, 4 to 12 carbon atoms, or 6 to 12 carbon atoms.

The substituent defined in Formulas 3 to 5, for example, the alkyl group, the alkylene group, the alkylidene group or the radical of (m+n) valence, may be substituted with one or more substituents, as necessary. In this case, examples of the substituent may, for example, include an alkyl group, an alkoxy group, an epoxy group, an oxo group, an oxetanyl group, a thiol group, a cyano group, a carboxyl group, or an aryl group, but the present invention is not limited thereto.

The blending ratio of the polymerizable compound such as an acrylate compound in the precursor is not particularly limited as long as it does not cause damage to desired physical properties, for example, alignability of the polymer network. For example, the polymerizable compound may be included at a content of approximately 40 to 1,000 parts by weight, based on 100 parts by weight of the silicon compound in the precursor.

In addition to the above-described compounds, the polymer network or precursor thereof may further include an additive such as a solvent, a radical or cationic initiator, a basic material, other reactive compound capable of forming a network, a liquid crystal compound, or a surfactant. For example, the polymer network or precursor thereof may include a liquid crystal compound, for example, a reactive mesogen compound. In such a case, the ratio of the liquid crystal compound may also be properly adjusted to a low content.

The polymer network may satisfy the following Expression A together with a liquid crystal compound of a liquid crystal region.

$(1-a)\times\{(2n_o^2+n_e^2)/3\}^{0.5} \leq n_p \leq (1+a)\times n_e$ [Expression A]

In Expression A, a is a number ranging from 0 to 0.5, $n_o$ represents an ordinary refractive index of the liquid crystal compound, $n_e$ represents an extraordinary refractive index of the liquid crystal compound, and $n_p$ represents a refractive index of the polymer network.

Unless particularly stated otherwise in this specification, the term "refractive index" may refer to a refractive index measured for light with a wavelength of 550 nm. Also, when the ordinary refractive index and the extraordinary refractive index of the polymer network are different, the term "refractive index" of the polymer network refers to an ordinary refractive index of the polymer network. As the polymer network and the liquid crystal compound may be selected so that the polymer network and the liquid crystal compound can satisfy Expression A, a device capable of having excellent transparency and securing high contrast ratio when driven in a transparent mode may be provided.

In Expression A, the "a" is, for example, less than 0.4, less than 0.3, less than 0.2 or less than 0.1, or may be 0.

The polymer network may have a dielectric anisotropy of 3 or more, 3.5 or more, or 4 or more. The driving voltage characteristics of the liquid crystal device may be maintained excellently within this dielectric anisotropy range. The upper limit of the dielectric anisotropy is not particularly limited, and may be, for example, approximately 20 or less, 15 or less, or 10 or less.

The liquid crystal region dispersed in the polymer network includes a liquid crystal compound. All kinds of compounds may be used as the liquid crystal compound as long as they can be phase-separated in the polymer network and may be present in a state in which they are aligned by the polymer network. For example, a smectic liquid crystal compound, a nematic liquid crystal compound or a cholesteric liquid crystal compound may be used as the liquid crystal compound. The liquid crystal compound is phase-separated, and thus is not bound to the polymer network. When a voltage is applied from the outside, the liquid crystal compound may have a structure in which alignment is switched through application of voltage. For this purpose, the liquid crystal compound may be, for example, a compound having no polymerizable or cross-linkable groups.

According to one exemplary embodiment, a liquid crystal compound satisfying the following Expression B, for example, a nematic liquid crystal compound, may be used as the liquid crystal compound.

$(n_e+n_o)/2-b \leq \{(2n_o^2+n_e^2)/3\}^{0.5} \leq (n_e+n_o)/2+b$ [Expression B]

In Expression B, $n_e$ represents an extraordinary refractive index of the liquid crystal compound, $n_o$ represents an ordinary refractive index of the liquid crystal compound, and b is a number ranging from 0.1 to 1.

When the liquid crystal compound satisfies Expression B, a device having excellent transparency and high contrast ratio when driven a transparent mode may be provided.

According to another exemplary embodiment, "b" in Expression B may be in a range of 0.1 to 0.9, 0.1 to 0.7, 0.1 to 0.5, or 0.1 to 0.3.

The liquid crystal compound has a difference between an extraordinary dielectric anisotropy ($\varepsilon_e$; a dielectric anisotropy in a longer axis direction) and an ordinary dielectric anisotropy ($\varepsilon_o$; a dielectric anisotropy in a shorter axis direction) of 4 or more, 6 or more, 8 or more, or 10 or more. When the liquid crystal compound has such a dielectric anisotropy, a device having excellent driving voltage characteristics may be provided. As the difference in dielectric anisotropy become higher, the device may exhibit proper characteristics. Here, the upper limit of the difference in dielectric anisotropy is not particularly limited. For example, a compound having an extraordinary dielectric anisotropy ($\varepsilon_e$; a dielectric anisotropy in a longer axis direction) of approximately 6 to 50 and an ordinary dielectric anisotropy ($\varepsilon_o$; a dielectric anisotropy in a shorter axis direction) of approximately 2.5 to 7 may be used as the liquid crystal compound.

The liquid crystal layer may include the polymer network at 5 to 70 parts by weight and the liquid crystal compound at 30 to 95 parts by weight. According to another exemplary embodiment, the liquid crystal layer may include the polymer network at 5 to 65 parts by weight and the liquid crystal compound at 35 to 95 parts by weight, include the polymer network at 5 to 60 parts by weight and the liquid crystal compound at 40 to 95 parts by weight, include the polymer network at 5 to 55 parts by weight and the liquid crystal compound at 55 to 95 parts by weight, include the polymer network at 5 to 50 parts by weight and the liquid crystal compound at 50 to 95 parts by weight, include the polymer network at 5 to 45 parts by weight and the liquid crystal compound at 55 to 95 parts by weight, include the polymer network at 5 to 40 parts by weight and the liquid crystal compound at 60 to 95 parts by weight, include the polymer network at 5 to 35 parts by weight and the liquid crystal compound at 65 to 95 parts by weight, include the polymer network at 5 to 30 parts by weight and the liquid crystal compound at 70 to 95 parts by weight, include the polymer network at 5 to 25 parts by weight and the liquid crystal compound at 75 to 95 parts by weight, include the polymer network at 20 to 50 parts by weight and the liquid crystal compound at 80 to 95 parts by weight, or include the polymer network at 5 to 15 parts by weight and the liquid crystal compound at 85 to 95 parts by weight. Within this weight ratio range, desired physical properties, for example, alignability, of the polymer network may be properly maintained.

The phase difference Rc of the liquid crystal layer is determined according to a desired mode or structure of a device, and thus is not particularly limited. For example, the liquid crystal layer may have a phase difference of approximately 240 nm to 310 nm, 245 nm to 305 nm, or 250 nm to 300 nm with respect to a wavelength of 550 nm. The phase difference of such a range may be suitable, for example, when a device formed in a normally transparent mode is formed between two polarizing layers.

For example, the liquid crystal layer may satisfy the following Expression C.

$$247 \text{ nm} \leq \{d \times (n_e - n_o)\} \times A \leq 302 \text{ nm} \quad \text{[Expression C]}$$

In Expression C, d represents a thickness (units: nm) of the liquid crystal layer, $n_e$ represents an extraordinary refractive index of the liquid crystal compound, $n_o$ represents an ordinary refractive index of the liquid crystal compound, and A represents a ratio (L/T) of the weight (L) of the liquid crystal compound with respect to the sum (T) of the weights of the polymer network and the liquid crystal compound, or a ratio (VL/TV) of the volume (VL) of the liquid crystal compound with respect to the total volume (TV) of the liquid crystal layer.

In Expression C, the value calculated by $\{d \times (n_e - n_o)\} \times A$ represents a theoretical phase difference of the liquid crystal layer. The theoretical phase difference of the liquid crystal layer is suitable as the theoretical phase difference becomes closer to the phase difference (i.e., a measured phase difference) of the liquid crystal layer. For example, the absolute value of a difference between the value calculated by $\{d \times (n_e - n_o)\} \times A$ in Expression D and the measured phase difference of the liquid crystal layer may be less than or equal to approximately 15 nm, 10 nm, 8 nm, or 5 nm. For example, the liquid crystal layer satisfying Expression D may be properly realized when a device formed in a normally transparent mode is formed between two polarizing layers.

In Expression C, $(n_e - n_o)$ may be, for example, in a range of 0.05 to 0.20. According to another exemplary embodiment, $(n_e - n_o)$ may be greater than or equal to 0.07. According to still another exemplary embodiment, $(n_e - n_o)$ may be less than or equal to 0.18 or 0.15.

In Expression C, A represents a ratio (L/T) of the weight (L) of the liquid crystal compound with respect to the sum (T) of the weights of the polymer network and the liquid crystal compound, or a ratio (VL/TV) of the volume (VL) of the liquid crystal compound with respect to the total volume (TV) of the liquid crystal layer, and may be, for example, in a range of 0.5 to 0.98. According to another exemplary embodiment the ratio (L/T or VL/TV) may be greater than or equal to 0.6 or 0.7.

The thickness of the liquid crystal layer is not particularly limited as long as it is set to satisfy the above-described requirements. For example, the thickness of the liquid crystal layer may be in a range of approximately 1 μm to 10 μm.

The liquid crystal device may further include an alignment film. For example, the alignment film may be disposed adjacent to the liquid crystal layer. In the present invention, the expression "the alignment film being disposed adjacent to the liquid crystal layer" means that the alignment film is disposed so that the alignment film can have an influence on alignment of the liquid crystal layer. According to one exemplary embodiment, the expression may mean that the alignment film is formed in contact with the liquid crystal layer. However, the alignment film and the liquid crystal layer are not necessarily formed in contact with each other as long as the alignment film is present at a position at which the alignment film can have an influence on alignment of the liquid crystal layer. FIG. 1 shows a structure of an illustrative liquid crystal device. Here, the liquid crystal device includes an alignment film 101 and a liquid crystal layer 102 formed on one surface of the alignment film 101, and the liquid crystal layer 102 includes a polymer network 1021 and a liquid crystal region 1022. As shown in FIG. 1, the alignment film 101 is formed on one surface of the liquid crystal layer 102, but may be formed on both surfaces of the liquid crystal layer. In the present invention, the liquid crystal region refers to a region in which a liquid crystal compound is present in the polymer network. For example, the liquid crystal region may refer to a region which includes a liquid crystal compound and is dispersed in the polymer network in a state in which the region is phase-separated from the polymer network. In FIG. 1, the liquid crystal compound in the liquid crystal region 1022 is indicated by arrows.

When the liquid crystal device includes the alignment film, an alignment film including a photo-alignable compound may be, for example, used as the alignment film. In the present invention, the term "photo-alignable compound" may refer to a compound which can be orientationally ordered by irradiation with light and thus can align adjacent liquid crystal compounds in a predetermined direction through interaction such as anisotropic interaction in a state in which it is orientationally ordered. The photo-alignable compound may be present in the alignment film in a state in which the photo-alignable compound is ordered to exhibit directionality. The photo-alignable compound may be a single-molecule compound, a monomeric compound, an oligomeric compound, or a polymeric compound.

The photo-alignable compound may be a compound containing a photosensitive moiety. A variety of photo-alignable compounds that may be used for alignment of the liquid crystal compound have been widely known in the related art. For example, the photo-alignable compound that may be used herein may include a compound capable of being ordered by trans-cis photoisomerization; a compound capable of being ordered by photo-destruction such as chain scission or photo-oxidation; a compound capable of being ordered by photo-crosslinking or photo-polymerization such as [2+2] cycloaddition, [4+4] cycloaddition or photodimerization; a compound capable of being ordered by photo-Fries rearrangement; or a compound capable of being ordered by a ring opening/closure reaction. For example, examples of the compound capable of being ordered by the trans-cis photoisomerization may include an azo compound such as a sulfonated diazo dye or an azo polymer, or a stilbene compound, and examples of the compound capable of being ordered by the photo-destruction may include a cyclobutane-1,2,3,4-tetracarboxylic dianhydride, an aromatic polysilane or polyester, polystyrene, or a polyimide. Also, examples of the compound capable of being ordered by the photo-crosslinking or photo-polymerization may include a cinnamate compound, a coumarin compound, a cinnamamide compound, a tetrahydrophthalimide compound, a maleimide compound, a benzophenone compound, a diphenylacetylene compound, a compound (hereinafter referred to as a "chalcone compound") containing a chalconyl moiety as a photosensitive moiety, or a compound (hereinafter referred to as a "anthracenyl compound") containing an anthracenyl moiety, examples of the compound capable of being ordered by the photo-Fries rearrangement may include an aromatic compound such as a benzoate compound, a benzoamide compound, or a (meth)acrylamidoaryl (meth)acrylate compound, and examples of the compound capable of being ordered by the ring opening/closure reaction may include a compound, such as a spiropyran compound, which is capable of being ordered by a ring opening/closure reaction of a [4+2] π-electronic system, but the present invention is not limited thereto.

The photo-alignable compound may be a single-molecule compound, a monomeric compound, an oligomeric compound or a polymeric compound, or may be in the form of a blend of the above-described photo-alignable compound and the polymer. As such, the oligomeric or polymeric compound may have the above-described photosensitive moiety or a moiety derived from the above-described photo-alignable compound in the main or side chain thereof.

Examples of the polymer which has the photo-alignable compound-derived moiety or photosensitive moiety or may be mixed with the photo-alignable compound may include polynorbornene, polyolefin, polyarylate, polyacrylate, poly(meth)acrylate, polyimide, poly(amic acid), polymaleimide, polyacrylamide, poly(meth)acrylamide, polyvinyl ether, polyvinyl ester, polystyrene, polysiloxane, polyacrylonitrile or poly(meth)acrylonitrile, but the present invention is not limited thereto.

Representative examples of the polymer that may be included in the alignable compound may include polynorbornene cinnamate, polynorbornene alkoxy cinnamate, polynorbornene allyloyloxy cinnamate, polynorbornene fluorinated cinnamate, polynorbornene chlorinated cinnamate or polynorbornene dicinnamate, but the present invention is not limited thereto.

When the alignable compound is the polymeric compound, the alignable compound may, for example, have a number average molecular weight of approximately 10,000 g/mol to 500,000 g/mol, but the present invention is not limited thereto.

For example, the alignment film may be formed by blending the photo-alignable compound with a desired additive such as a photoinitiator to coat the photo-alignable compound with the additive and irradiating the additive with UV rays in a desired direction.

The liquid crystal device may include a polarizing layer(s) disposed at one or both sides of the liquid crystal layer. Conventional materials used for conventional LCDs, for example, a poly(vinyl alcohol) (PVA) polarizing plate, or a polarizing layer formed using a coating method, such as a polarized coating layer including lyotropic liquid crystals (LLCs) or a reactive mesogen (RM) and a dichroic dye, may be used as the polarizing layer without limitation. When the polarizing layer is present in the liquid crystal device, orientation of the light absorption axis of the polarizing layer is not particularly limited, and may be, for example, selected in consideration of initial alignment of the liquid crystal layer, and the mode of the device to be formed. For example, to form a device formed in a normally transparent mode, two polarizing layers are disposed at both sides of the liquid crystal layer. In this case, the respective polarizing layers may be disposed so that the light absorption axes of the polarizing layers forms one angle in a range of 80° to 100°, for example, a right angle, to each other. In this circumstance, the initial alignment of the liquid crystal layer may be achieved so that the liquid crystal layer can form an angle of 40° to 50° with respect to the light absorption axes of the two polarizing layers, for example, an angle of approximately 45°. In the present invention, the term "initial alignment" of the liquid crystal layer may mean the optical axis, for example, slow axis, of the liquid crystal layer in a state in which a voltage is not applied.

The liquid crystal device may include one or two or more substrate layers. In general, the liquid crystal layer may be disposed between two facing substrate layers. In such a structure, the alignment film may be disposed inside the substrate layers, for example, disposed between the liquid crystal layer and the substrate layers. For example, the liquid crystal device may further include the facing substrate layers, and the liquid crystal layer and the alignment film may be present between the facing substrate layers. FIG. 2 shows an illustrative liquid crystal device includes substrate layers 201A and 201B spaced apart at predetermined distances to face each other and an alignment film 101 and a liquid crystal layer 102 formed between the substrate layers 201A and 201B. When the substrate layers are present in the liquid crystal device, the above-described polarizing layers may be typically formed outside the substrate layers, but may be formed inside the substrate layers, that is, formed between the liquid crystal layer and the substrate layer, as necessary. In this case, the above-described polarized coating layer may be desirably used as the polarizing layer.

Materials known in the related art may be used as the substrate layers without limitation. For example, an inorganic film such as a glass film, a crystalline or amorphous silicon film or a quartz or indium tin oxide (ITO) film, or a plastic film may be used herein. An optically isotropic substrate layer, optically anisotropic substrate layer such as a retardation layer, a polarizing plate, or a color filter substrate may be used as the substrate layer. For example, when the polarizing layer is formed inside the substrate layers, that is, formed between the liquid crystal layer and the substrate layers, a device having proper performance may be realized even when the anisotropic substrate layer is used as the substrate layer.

Examples of the plastic substrate layer that may be used herein may include an substrate layer including triacetyl cellulose (TAC); a cycloolefin copolymer (COP) such as a norbornene derivative; poly(methyl methacrylate) (PMMA); polycarbonate (PC); polyethylene (PE); polypropylene (PP); PVA; diacetyl cellulose (DAC); polyacrylate (Pac); polyether sulfone (PES); polyetheretherketone (PEEK); polyphenylsulfone (PPS); polyetherimide (PEI); polyethylene naphthalate (PEN); polyethylene terephthalate (PET); polyimide (PI); polysulfone (PSF); polyarylate (PAR); or an amorphous fluororesin, but the present invention is not limited thereto. The substrate layer may include a coating layer formed of gold, silver, or a silicon compound such as silicon dioxide or silicon monoxide, or a coating layer such as an anti-reflection layer, as necessary.

An electrode layer may be included on a surface of the substrate layer, for example, a surface of the substrate layer at a side of the liquid crystal layer (for example, a surface of the substrate layer 101A or 101B in contact with the liquid crystal layer 102 as shown in FIG. 1). For example, the electrode layer may be formed by depositing a conductive polymer, a conductive metal, a conductive nanowire, or a metal oxide such as ITO. The electrode layer may be formed transparent. In the related art, various materials and methods used to form a transparent electrode layer are known. These methods are all applicable. As necessary, the electrode layer formed on a surface of the substrate layer may be properly patterned.

An electrode layer may be formed on a surface of the substrate layer, for example, a surface of the substrate layer at side of the liquid crystal layer (for example, a surface of the substrate layer 201A or 201B coming in contact with the alignment film 101 or the liquid crystal layer 102 as shown in FIG. 2). For example, the electrode layer may be formed by depositing a conductive polymer, a conductive metal, a, conductive nano ire, or a metal oxide such as ITO. The electrode layer may be formed to exhibit transparency. Various materials and methods capable of being used to form a transparent electrode layer are known in the related art. These methods are all applicable. As necessary, the electrode layer formed on a surface of the substrate layer may be properly patterned.

The liquid crystal device may be realized to switch between a scattering mode and a transparent mode or between a transparent mode and a black mode. When the liquid crystal device is realized to switch between the scattering mode and the transparent mode, the liquid crystal compound may be present in an unordered fashion in an initial state. On the other hand, when the liquid crystal device is realized to switch between the transparent mode and the black mode, the liquid crystal compound may be present in an ordered fashion in an initial state. In the present invention, the term "initial state" may refer to a state in which there is no external action that can affect the alignment of the liquid crystal compound, such as application of external voltage.

When the liquid crystal device is realized to switch between the transparent mode and the black mode, the liquid crystal compound may be present in the liquid crystal layer in a state in which the liquid crystal compound can be ordered in an initial state in one direction. In this case, such an ordering direction may vary by an external action, for example, application of external voltage. Therefore, a device configured to be switchable between the transparent mode and the black mode may be realized in the present invention. For example, when the liquid crystal layer is positioned so that the light absorption axes of the two polarizing layers can form an angle of 80° to 100° as described above, for example, that the initial alignment of the liquid crystal layer between the two polarizing layers disposed perpendicularly to each other can form an angle of 40° to 50°, for example, an angle of 45°, with respect to the light absorption axes of the polarizing layers, a device formed in a normally transparent mode may be realized. In such a state, a black mode may be achieved by altering an alignment state, for example, a vertical alignment state, of the liquid crystal compound through application of voltage. In the present invention, the term "black mode" is used as a concept for discriminating from a so-called scattering mode in conventional PDLCs. For example, the haze in the black mode is 10% or less, 8% or less, 6% or less, or 5% or less. Therefore, in the present invention, the term "scattering mode" may, for example, refer to a state in which the haze is 10% or more, 15% or more, 20% or more, 25% or more, 30% or more, 35% or more, 40% or more, 45% or more, 50% or more, 55% or more, 60% or more, 65% or more, 70% or more, 75% or more, 80% or more, 85% or more, 90% or more, or 95% or more. In the transparent mode of the device according to the present invention, the haze may also 10% or less, 8% or less, 6% or less, or 5% or less. The haze may be a percentage of transmissivity of diffused light with respect to transmissivity of total transmitted light transmitting a measuring object. The haze may be evaluated using a hazemeter (NDH-5000SP). The haze may be evaluated using the hazemeter, as follows. That is, light is incident on the integrating sphere by transmitting light through a measuring object. In this procedure, the light is divided into diffused light (DT) and parallel light (PT) by means of the measuring object. In this case, these kinds of light are reflected in the integrating sphere, and collected in a light-receiving device, and the haze may be measured through collected light. That is, The total transmitted light (TT) collected in this procedure may be the sum (DT+PT) of the diffused light (DT) and the parallel light (PT), and the haze may be defined as a percentage of the diffused light with respect to the total transmitted light (Haze (%)=100×DT/TT). Also, the liquid crystal device according to the present invention may have excellent transparency in a transparent mode. For example, the liquid crystal device may have a light transmittance of 80% or more, 85% or more, 90% or more or 95% or more in a typical alignment state, that is, a state in which there is no external action, for example, a state in which a voltage is not applied, when the liquid crystal device is driven in a normally transparent mode. Also, the liquid crystal device may have the above-described light transmittance in a state in which there is an external action such as application of voltage when the liquid crystal device is driven in a normally black mode. The light transmittance may be a light transmittance for wavelengths of a visible light region, for example, approximately 400 nm to 700 nm.

The liquid crystal device may have a high contrast ratio. In the present invention, the term "contrast ratio" may means a ratio (T/B) of brightness (T) in the transparent mode with respect to brightness (B) in the black or scattering mode. According to one exemplary embodiment, the liquid crystal device may include the liquid crystal layer, and two polarizing layers (i.e., first and second polarizing layers) disposed at both sides of the liquid crystal layer, and may have the highest contrast ratio of 200 or more, 250 or more, 300 or more, or 350 or more. The higher contrast ratio means that the device has the more excellent performance. In this case, the upper limit of the contrast ratio is not particularly limited. For example, the contrast ratio may be 600 or less, 550 or less, 500 or less, 450 or less, or 400 or less. As described above, the device may be realized using the alignable polymer network and the polarizing layer so as to achieve such a contrast ratio.

The liquid crystal device may be driven at a low driving voltage. In the liquid crystal device, a voltage required to realize a light transmittance of 10% or 90% may be, for example, 60 V or less, 50 V or less, 40 V or less, 30 V or less, 25 V or less, 22 V or less, or 20 V or less. That is, in the case of the device formed in a normally transparent mode, the black mode may be realized by altering an ordering direction of the liquid crystal compound through application of voltage. In this procedure, the voltage required to realize a light transmittance of 10% may fall within this voltage range. On the contrary, in the case of the device formed in a normally black mode or a normally scattering mode, the transparent mode may be realized by altering an ordering direction of the liquid crystal compound through application of voltage. In this procedure, the voltage required to realize a light transmittance of 90% may fall within this voltage range. The lower desired voltage means that that the device has the more excellent performance, and thus the lower limit of the desired voltage is not particularly limited. For example, the desired voltage may be greater than or equal to 5 V. As described above, the device may be realized using the alignable polymer network and the polarizing layer so as to achieve such a low driving voltage.

Another aspect of the present invention provides a precursor composition for liquid crystal layers, for example, a precursor composition capable of forming the liquid crystal layer, or a method of manufacturing a liquid crystal device using the precursor composition.

The illustrative precursor composition may include a precursor configured to form a polymer network, for example, a polymer network precursor as described above, and a liquid crystal compound.

Specific contents of the precursor are applicable in the same manner as in the above-described contents. For example, the precursor may include the same polymerizable or non-polymerizable silicon compound as represented by Formula 1 or 2. As such, when two or more silicon compounds are used herein, the kinds and ratios of the silicon compounds, other compounds that may be included in the precursor including an acrylate compound, the kind of a liquid crystal compound that may be included in combination with the precursor, and contents of Expressions A to C are applicable in the same manner as in the above-described contents.

The weight ratios of the precursor and the liquid crystal compound in the composition are not particularly limited. For example, the composition may be included at a content of approximately 600 to 1,200 parts by weight, approximately 700 to 1,100 parts by weight, approximately 750 to 1,050 parts by weight, or approximately 800 to 1,000 parts by weight, based on 100 parts by weight of the precursor. Also, the ratio of the silicon compound in the precursor is not particularly limited. For example, the silicon compound may be included at a content of, for example, 5% by weight or more, 10% by weight or more, 15% by weight or more, 20% by weight or more, 25% by weight or more, 30% by weight or more, 35% by weight or more, 40% by weight or more, 45% by weight or more, or 50% by weight or more, based on the solid content of the precursor. The upper limit of the ratio of the silicon compound in the precursor is not particularly limited. Considering that the solid content of the precursor may be completely converted into the silicon compound, the upper limit of the ratio of the silicon compound may be 100% by weight, based on the solid content of the precursor.

The composition may be prepared by dissolving other additional additives (for example, an initiator, etc.) in addition to the precursor and the liquid crystal compound in a proper solvent. Examples of the solvent that may be used herein may include a solvent known in the related art, such as toluene, xylene, cyclopentanone, or cyclohexanone.

The manufacturing method may include forming a liquid crystal layer including a liquid crystal compound dispersed in a polymer network by polymerizing a layer including the composition, for example, a layer formed by coating the composition. As such, the polymerization may be performed by irradiating the composition with a suitable energy, for example, light, to induce the polymerization.

To form a proper alignable polymer network, the polymerization may be performed on the alignment film. For example, the liquid crystal layer may be formed by forming a layer of the precursor on an alignment film or forming a layer of the precursor between the facing alignment films and polymerizing the layer through application of energy.

For example, the alignment film may be formed by coating a proper substrate, for example, a substrate layer, with a precursor for alignment films including the photo-alignable compound, and exposing the precursor with light to align the photo-alignable compound. FIG. 3 schematically shows a method of forming an alignment film 101 by irradiating a precursor for alignment films formed on an substrate layer 201A with light.

For example, the precursor for alignment films may further include a proper amount of an initiator in addition to the photo-alignable compound, and may also include another additive such as a surfactant, as necessary. A layer of the precursor for alignment films may be, for example, formed by coating the precursor using a conventional coating method such as bar coating, comma coating, ink jet coating, or spin coating. For example, the above-described transparent electrode layer may be formed on a surface of the substrate layer having the layer of the precursor formed therein.

After formation of the layer of the precursor, the layer of the precursor may be irradiated with light. When the solvent is included in the precursor, for example, irradiation with light may be performed after the formed layer is dried under proper conditions to volatilize the solvent. Such drying may be, for example, performed at a temperature of approximately 60° C. to 130° C. for approximately 1 to 5 minutes, but the present invention is not limited thereto.

For example, the irradiation with light may be performed so as to align the alignable compound included in the layer of the precursor. In general, the alignable compound may be aligned by linearly polarized light. The wavelength or intensity of light to be irradiated may be chosen to provide proper alignment of the alignable compound. Typically, the photo-alignable compound may be aligned using light with a visible or near-ultraviolet range. As necessary, the alignable compound may be aligned using light with a far-ultraviolet or near-infrared range.

After formation of the alignment film, a layer of a precursor for liquid crystal layers may be formed adjacent to the alignment film. FIG. 4 schematically shows a method of forming a liquid crystal layer 102 by irradiating a precursor for liquid crystal layers, which is present on a surface of the alignment film 101 formed as shown in FIG. 3, with light. As shown in FIG. 4, the liquid crystal layer is formed on one alignment film. As necessary, however, the liquid crystal layer may be formed between the two alignment films as described above. The layer of the precursor for liquid crystal layers may be, for example, formed by coating the composition.

After formation of the layer of the precursor, the liquid crystal layer may be formed by applying energy to the layer of the precursor using a method such as irradiation with light. Therefore, a polymer network and a liquid crystal region may be formed by polymerization of the polymer network precursor and phase separation of the liquid crystal compound. When the solvent included in the precursor for liquid crystal layers, for example, the polymerization may be performed after the formed layer is dried under proper conditions to volatilize the solvent.

To form a proper alignable polymer network, the polymerization may be performed in a state in which the layer of the precursor for liquid crystal layers, that is, a layer of the above-described composition maintains a nematic state. When the layer of the precursor is formed in a state other than the nematic state, it is difficult to ensure proper alignability. To maintain the nematic state, the polymerization may be performed at a temperature less than a nematic temperature (Tni) of the layer of the precursor for liquid crystal layers, that is, a layer of the above-described composition. In the present invention, the term "nematic temperature" refers to a temperature of the layer whose nematic state is transferred to an isotropic state. In this case, a range of the nematic temperature may be determined according to a composition of the layer. The nematic temperature is not particularly limited as long as the polymerization can be performed at the nematic temperature of the layer, that is, performed in a state in which the layer is in a nematic state.

The conditions for application of energy, for example, irradiation with light, for polymerization is not particularly limited as long as it can be performed so that the polymerizable compound can be polymerized to form a polymer network, and the liquid crystal compound can be phase-separated to form a liquid crystal region. To facilitate formation of the alignable network, a proper heat application or light exposure process may be performed before or after the irradiation with light, or performed at the same time as the irradiation with light, as necessary.

After formation of the liquid crystal layer, a method of disposing a polarizing layer(s) at one or both sides of the formed liquid crystal layer may be further performed, as necessary.

Still another aspect of the present invention provides use of the liquid crystal device. For example, the illustrative liquid crystal device may be manufactured simply in a consecutive manner using a roll-to-roll process. Also, the liquid crystal cell may be realized as a flexible device, and may have an excellent contrast ratio.

For example, the present invention is directed to providing a light modulation device including the liquid crystal device. Examples of the light modulation device may include a smart window, a window-protecting film, a flexible display device, an active retarder for displaying a 3D image, or a viewing angle-adjusting film, but the present invention is not limited thereto. A method of constituting the above-described light modulation device is not particularly limited. For example, conventional methods may be applied as long as the liquid crystal device can be used for the conventional methods.

Advantage Effects

A device capable of being driven at a low driving voltage can be provided in the present invention. For example, the device can be realized so that the device can be driven in a normally transparent mode or a normally black mode. Also, the device has other excellent characteristics such as contrast ratio. Such a liquid crystal device can be applied to various light modulation devices such as smart windows, window-protecting films, flexible display devices, active retarders for displaying 3D images, or viewing angle-adjusting films.

DETAILED DESCRIPTION OF EXEMPLARY EMBODIMENTS

Figure 1:
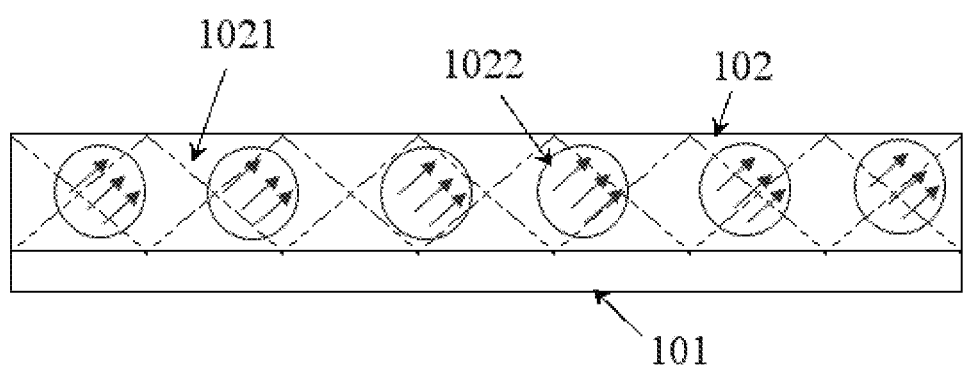
FIGS. 1 and 2 are diagrams showing exemplary liquid crystal devices.
Figure 2:
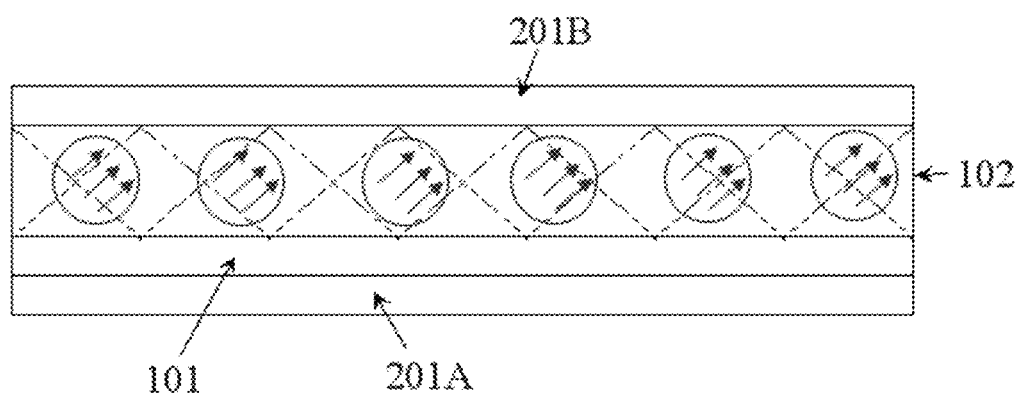
Figure 3:
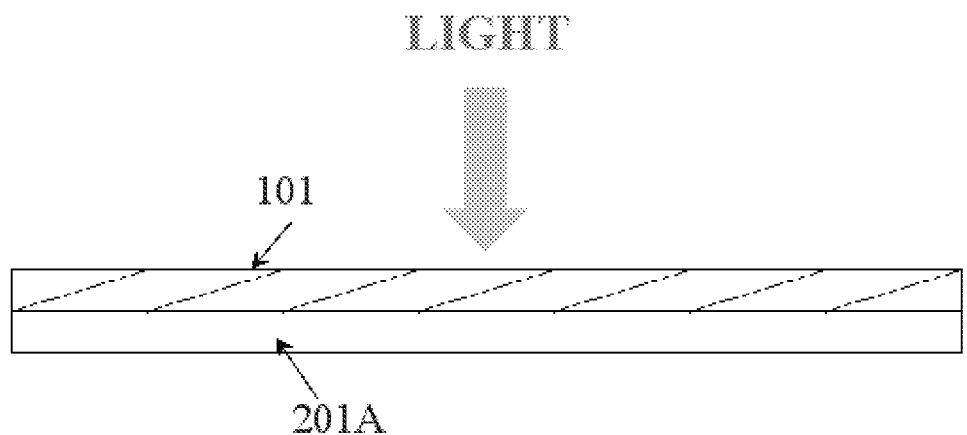
FIGS. 3 and 4 are diagrams showing exemplary methods of manufacturing a liquid crystal device.
Figure 4:
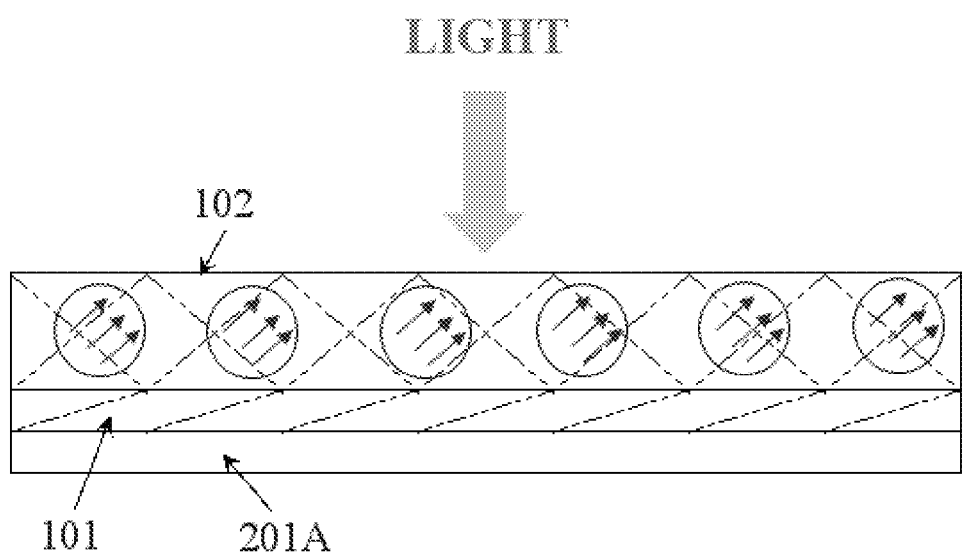

Hereinafter, the present invention will be described with reference to Examples and Comparative Examples in detail. However, the scope of the present invention is not limited to the following Examples.

Example 1

Formation of Alignment Film
A polynorbornene having a repeating unit represented by the following Formula A (PNBCi; weight average molecular weight: 85,000, and polydispersity index (PDI): approximately 4.75) and a photoinitiator (Igacure 907; polynorbornene:photoinitiator=2:0.25 (based on the weight)) were dissolved in toluene so that a solid content of the polynorbornene solid content amounted to 2% by weight, thereby preparing a precursor for alignment films. An electrode layer of a polycarbonate (PC) film (i.e., an substrate layer) having an ITO transparent electrode layer formed on a surface thereof was coated with the precursor, and the precursor was irradiated with linearly polarized UV rays (1,200 mJ/cm$^2$) by means of a wire grid polarizer (WGP) to form an alignment film.

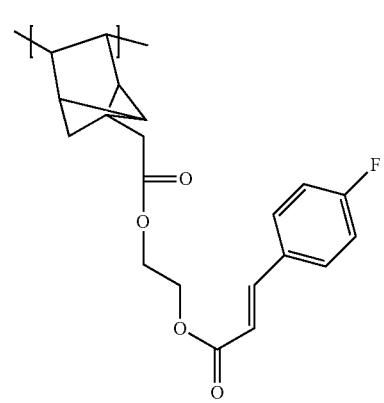

[Formula A]

Preparation of Precursor Composition for Liquid Crystal Layer and Manufacture of Device 70 parts by weight of a compound (HDDA) represented by the following Formula B and 30 parts by weight of a silicon compound represented by the following Formula C were mixed to prepare a precursor. Thereafter, 10 parts by weight of the precursor and 90 parts by weight of a liquid crystal compound (ZGS-8017, JNC, extraordinary refractive index: approximately 1.597, and ordinary refractive index: approximately 1.487) were mixed, and the resulting mixture was dissolved in a toluene solvent together with a proper amount of an initiator to prepare a precursor composition. Subsequently, a surface of the prepared alignment film was coated with the precursor composition. A surface of an alignment film of a PC film having the alignment film formed on one surface thereof in the same manner as described in the contents for forming an alignment film was deposited on the coated composition so that the surface of the alignment film came in contact with the coating layer, and the coated composition was irradiated with UV rays (300 mW/cm$^2$) to form a liquid crystal layer. Then, two polarizing plates (PVA-based polarizing plates) were disposed at both external sides of the PC film so that the directions of the light absorption axes were perpendicular to each other. In this procedure, the light absorption axes of the polarizing plates were set to form an angle of 45° with respect to the alignment direction of the alignment film of the PC film.

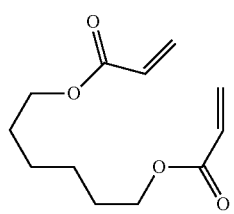

[Formula B]

-continued

[Formula C]

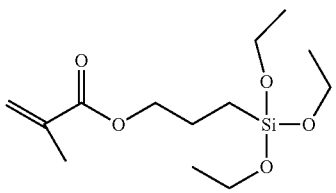

Example 2

A device was manufactured in the same manner as in Example 1, except that 30 parts by weight of a compound represented by the following Formula D was mixed with 70 parts by weight of the compound of Formula B to prepare a precursor.

[Formula D]

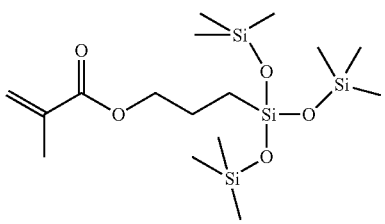

Example 3

A device was manufactured in the same manner as in Example 1, except that 50 parts by weight of a compound represented by the following Formula E was mixed with 50 parts by weight of the compound of Formula B to prepare a precursor.

[Formula E]

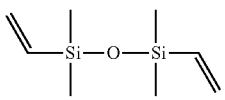

Example 4

A device was manufactured in the same manner as in Example 3, except that 45 parts by weight of the compound of Formula E and 45 parts by weight of the compound of Formula B were mixed with 10 parts by weight of a compound represented by the following Formula F to prepare a precursor.

[Formula F]

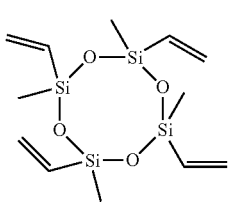

Example 5

A device was manufactured in the same manner as in Example 3, except that 45 parts by weight of the compound of Formula E and 45 parts by weight of the compound of Formula B were mixed with 10 parts by weight of a compound represented by the following Formula G to prepare a precursor.

[Formula G]

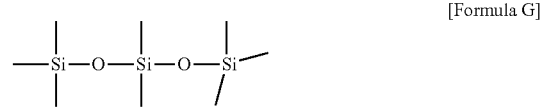

Example 6

A device was manufactured in the same manner as in Example 3, except that 40 parts by weight of the compound of Formula E and 40 parts by weight of the compound of Formula B were mixed with 20 parts by weight of the compound of Formula G to prepare a precursor.

Example 7

A device was manufactured in the same manner as in Example 3, except that 80 parts by weight of the compound of Formula E, 10 parts by weight of the compound of Formula F, and 10 parts by weight of the compound of Formula G were mixed to prepare a precursor.

Example 8

A device was manufactured in the same manner as in Example 3, except that 70 parts by weight of the compound of Formula B and 30 parts by weight of the compound of Formula G were mixed to prepare a precursor.

Example 9

A device was manufactured in the same manner as in Example 1, except that 60 parts by weight of the compound of Formula B, 30 parts by weight of the compound of Formula E and 10 parts by weight of the compound of Formula F were mixed to prepare a precursor.

Example 10

A device was manufactured in the same manner as in Example 1, except that 60 parts by weight of the compound of Formula B, 30 parts by weight of the compound of Formula E and 10 parts by weight of the compound of Formula G were mixed to prepare a precursor.

Example 11

A device was manufactured in the same manner as in Example 1, except that 50 parts by weight of the compound of Formula E and 50 parts by weight of the compound of Formula F were mixed to prepare a precursor.

Example 12

A device was manufactured in the same manner as in Example 1, except that 80 parts by weight of the compound of Formula E and 20 parts by weight of the compound of Formula F were mixed to prepare a precursor.

Example 13

A device was manufactured in the same manner as in Example 1, except that 50 parts by weight of the compound of Formula E was mixed with 50 parts by weight of a compound represented by Formula H to prepare a precursor.

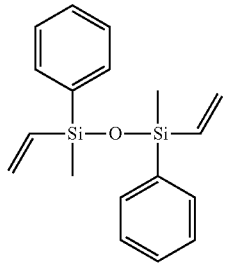

[Formula H]

Example 14

A device was manufactured in the same manner as in Example 13, except that 80 parts by weight of the compound of Formula E and 20 parts by weight of the compound of Formula H were mixed to prepare a precursor.

Example 15

A device was manufactured in the same manner as in Example 13, except that 20 parts by weight of the compound of Formula E and 80 parts by weight of the compound of Formula H were mixed to prepare a precursor.

Example 16

A device was manufactured in the same manner as in Example 1, except that 50 parts by weight of a compound represented by the following Formula I was mixed with 50 parts by weight of the compound of Formula E to prepare a precursor.

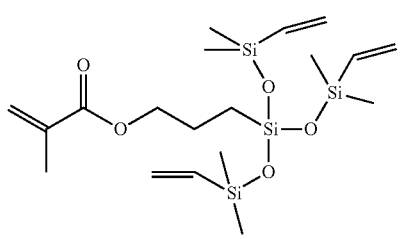

[Formula I]

Example 17

A device was manufactured in the same manner as in Example 1, except that 50 parts by weight of a compound represented by the following Formula J was mixed with 50 parts by weight of the compound of Formula E to prepare a precursor.

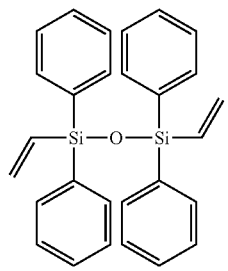

[Formula J]

Example 18

A device was manufactured in the same manner as in Example 1, except that 90 parts by weight of the compound of Formula B and 10 parts by weight of the compound of Formula C were mixed to prepare a precursor.

Example 19

A device was manufactured in the same manner as in Example 1, except that 90 parts by weight of the compound of Formula B and 10 parts by weight of the compound of Formula D were mixed to prepare a precursor.

Example 20

A device was manufactured in the same manner as in Example 1, except that 90 parts by weight of the compound of Formula B was mixed with 10 parts by weight of a compound represented by the following Formula K to prepare a precursor.

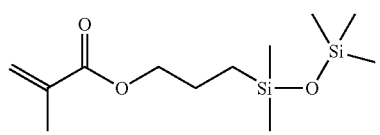

[Formula K]

Example 21

A device was manufactured in the same manner as in Example 1, except that 90 parts by weight of the compound of Formula B and 10 parts by weight of the compound of Formula I were mixed to prepare a precursor.

Example 22

A device was manufactured in the same manner as in Example 1, except that 90 parts by weight of the compound of Formula B and 10 parts by weight of the compound of Formula E were mixed to prepare a precursor.

Example 23

A device was manufactured in the same manner as in Example 1, except that 90 parts by weight of the compound of Formula B and 10 parts by weight of the compound of Formula H were mixed to prepare a precursor.

Example 24

A device was manufactured in the same manner as in Example 1, except that 90 parts by weight of the compound of Formula B and 10 parts by weight of the compound of Formula L were mixed to prepare a precursor.

[Formula L]

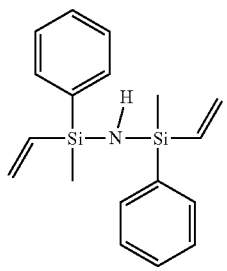

Example 25

A device was manufactured in the same manner as in Example 1, except that 90 parts by weight of the compound of Formula B and 10 parts by weight of the compound of Formula J were mixed to prepare a precursor.

Example 26

A device was manufactured in the same manner as in Example 1, except that 90 parts by weight of the compound of Formula B was mixed with 10 parts by weight of a compound represented by the following Formula M to prepare a precursor.

[Formula M]

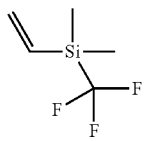

Example 27

A device was manufactured in the same manner as in Example 1, except that 90 parts by weight of the compound of Formula B was mixed with 10 parts by weight of a compound represented by the following Formula N to prepare a precursor.

[Formula N]

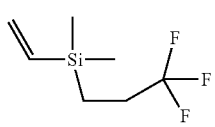

Example 28

A device was manufactured in the same manner as in Example 1, except that 90 parts by weight of the compound of Formula B was mixed with 10 parts by weight of a compound represented by the following Formula O to prepare a precursor.

[Formula O]

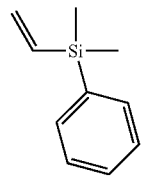

Example 29

A device was manufactured in the same manner as in Example 1, except that 90 parts by weight of the compound of Formula B was mixed with 10 parts by weight of a compound represented by the following Formula P to prepare a precursor.

[Formula P]

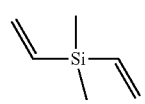

Example 30

A device was manufactured in the same manner as in Example 1, except that 90 parts by weight of the compound of Formula B was mixed with 10 parts by weight of a compound represented by the following Formula Q to prepare a precursor.

[Formula Q]

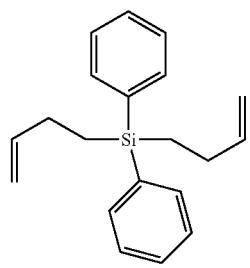

Example 31

A device was manufactured in the same manner as in Example 1, except that 90 parts by weight of the compound of Formula B was mixed with 10 parts by weight of a compound represented by the following Formula R to prepare a precursor.

[Formula R]

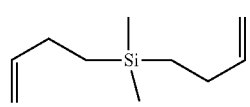

Example 32

A device was manufactured in the same manner as in Example 1, except that 90 parts by weight of the compound of Formula B and 10 parts by weight of the compound of Formula F were mixed to prepare a precursor.

Example 33

A device was manufactured in the same manner as in Example 1, except that 90 parts by weight of the compound of Formula B and 10 parts by weight of the compound of Formula G were mixed to prepare a precursor.

Comparative Example 1

A device was manufactured in the same manner as in Example 1, except that only a compound represented by the following Formula S was mixed with the liquid crystal compound and the initiator to prepare a precursor.

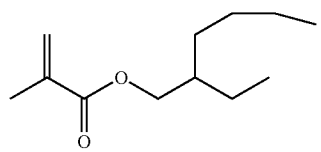

[Formula S]

Comparative Example 2

A device was manufactured in the same manner as in Example 1, except that only a compound represented by the following Formula T was mixed with the liquid crystal compound and the initiator to prepare a precursor.

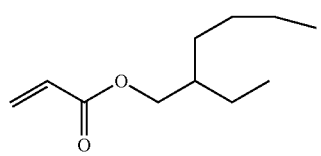

[Formula T]

Experiment Example 1: Confirmation of Alignment

Each of the liquid crystal layers prepared in Examples was positioned between two polarizing plates whose light absorption axes were arranged perpendicularly to each other, and the alignability was evaluated by determining whether the device can switch between a transparent (white) mode and a black mode. When the device switched between the transparent mode and the black mode in the process, it could be seen that the liquid crystal compound in the polymer network was aligned in the liquid crystal layer. As a result, it was confirmed that the switching between the transparent mode and the black mode was observed in the case of all Examples, but was not observed in the case of Comparative Examples.

Experiment Example 2: Evaluation of Driving Voltage

An AC power source was connected to ITO transparent electrode layers of upper and lower substrate layers of each of the devices manufactured Examples and Comparative Examples, and the driving voltage required to drive each of the devices was measured whiling driving the devices. The driving voltage was measured at a point of time where the switching was blocked to the maximum when a device formed in a normally transparent mode switched to a black mode by application of voltage.

The measurement results on such driving voltages are listed in the following Table 1.

TABLE 1

|  |  | Driving voltage (Unit: Volt) |
|---|---|---|
| Examples | 1 | 9.1 |
|  | 2 | 12.0 |
|  | 3 | 18.2 |
|  | 4 | 17.0 |
|  | 5 | 16.1 |
|  | 6 | 14.5 |
|  | 7 | 14.0 |
|  | 8 | 28.0 |
|  | 9 | 20.0 |
|  | 10 | 21.0 |
|  | 11 | 9.5 |
|  | 12 | 9.1 |
|  | 13 | 10.0 |
|  | 14 | 9.5 |
|  | 15 | 10.5 |
|  | 16 | 11.0 |
|  | 17 | 10.9 |
|  | 18 | 20 |
|  | 19 | 23 |
|  | 20 | 23 |
|  | 21 | 30 |
|  | 22 | 40 |
|  | 23 | 32 |
|  | 24 | 30 |
|  | 25 | 35 |
|  | 26 | 40 |
|  | 27 | 42 |
|  | 28 | 38 |
|  | 29 | 40 |
|  | 30 | 35 |
|  | 31 | 32 |
|  | 32 | 32 |
|  | 33 | 34 |
| Comparative Examples | 2 | 103 |
|  | 3 | 105 |

DESCRIPTION OF THE MARKS IN DRAWINGS

101: alignment film
102: liquid crystal layer
1021: polymer network
1022: liquid crystal region
201A, 201B: substrate layer

What is claimed is:

1. A liquid crystal device comprising a liquid crystal layer, wherein the liquid crystal layer comprises:
   a polymer network of a precursor comprising a silicon compound; and
   a liquid crystal compound present in a state dispersed in the polymer network, and
   an alignment film disposed adjacent to the liquid crystal layer,
   wherein the liquid crystal device further comprises polarizing layers disposed at both sides of the liquid crystal layer,
   wherein the light absorption axes of the two polarizing layers form an angle ranging from 80° to 100° with respect to each other, and the liquid crystal layer is initially aligned to form an angle ranging from 40° to 50° with respect to the light absorption axes of the two polarizing layers, wherein the liquid crystal device is driven in a normally transparent mode, wherein a haze is 10% or less and a light transmittance is 80% or more in a transparent mode of the liquid crystal device, wherein the silicon compound is represented by the following Formula 1 or 2, and wherein the liquid crystal compound is present in the liquid crystal layer in a state in which the liquid crystal compound is ordered in an initial state in one direction:

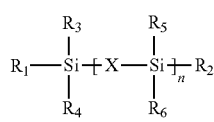

[Formula 1]

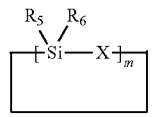

[Formula 2]

where in Formula 1 or Formula 2, n is an integer ranging from 0 to 10, m is an integer ranging from 2 to 8, X is —O— or —NW—, and $R_1$ to $R_6$ are each independently an alkyl group, an alkoxy group, an aryl group, a polymerizable functional group, -A-$R_7$ or -L-Si$(R_8)_p$$(R_9)_{(3-p)}$, wherein A and L are each independently an alkylene group, an alkynylene group, an arylene group, an alkenylene group, an alkylidene group, —O— or —NW—, $R_7$ is an alkyl group, an alkoxy group, an aryl group or a polymerizable functional group, $R_8$ is a polymerizable functional group, $R_9$ is an alkyl group, an alkoxy group or an aryl group, p is an integer ranging from 0 to 3, and W is hydrogen or an alkyl group.

2. The liquid crystal device of claim 1, wherein the precursor further comprises a compound represented by one of the following Formulas 3 or 5:

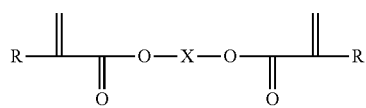

[Formula 3]

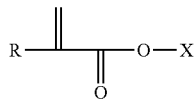

[Formula 5]

where in Formula 3, R each independently represents hydrogen or an alkyl group having 1 to 4 carbon atoms, and X represents an alkylene group or an alkylidene group having 1 to 20 carbon atoms; and in Formula 5, R represents hydrogen or an alkyl group having 1 to 4 carbon atoms, and X represents an alkyl group having 1 to 20 carbon atoms.

3. The liquid crystal device of claim 1, which satisfies the following Expression A:

$$(1-a)\times\{(2n_o^2+n_e^2)/3\}^{0.5} \le n_p \le (1+a)\times n_e$$ [Expression A]

where in Expression A, a is a number ranging from 0 to 0.5, $n_o$ represents an ordinary refractive index of the liquid crystal compound, $n_e$ represents an extraordinary refractive index of the liquid crystal compound, and $n_p$ represents a refractive index of the polymer network.

4. The liquid crystal device of claim 1, wherein the liquid crystal compound satisfies the following Expression B:

$$(n_e+n_o)/2-b \le \{(2n_o^2+n_e^2)/3\}^{0.5} \le (n_e+n_o)/2+b$$ [Expression B]

where in Expression B, $n_e$ represents an extraordinary refractive index of the liquid crystal compound, $n_o$ represents an ordinary refractive index of the liquid crystal compound, and b is a number ranging from 0.1 to 1.

5. The liquid crystal device of claim 1, wherein the liquid crystal layer comprises the polymer network at 5 to 70 parts by weight and the liquid crystal compound at 30 to 95 parts by weight.

6. The liquid crystal device of claim 1, which satisfies the following Expression C:

$$247 \text{ nm} \le \{d\times(n_e-n_o)\}\times A \le 302 \text{ nm}$$ [Expression C]

where in Expression C, d represents a thickness (units: nm) of the liquid crystal layer, $n_e$ represents an extraordinary refractive index of the liquid crystal compound, $n_o$ represents an ordinary refractive index of the liquid crystal compound, and A represents a ratio (L/T) of the weight (L) of the liquid crystal compound with respect to the sum (T) of the weights of the polymer network and the liquid crystal compound, or a ratio (VL/TV) of the volume (VL) of the liquid crystal compound with respect to the total volume (TV) of the liquid crystal layer.

7. The liquid crystal device of claim 1, wherein a voltage required to realize a light transmittance of 10% in the normally transparent mode is less than or equal to 60 V.

8. A light modulation device comprising the liquid crystal device defined in claim 1.

* * * * *